(12) United States Patent
Tang et al.

(10) Patent No.: US 6,245,853 B1
(45) Date of Patent: Jun. 12, 2001

(54) METHOD OF PREPARING CO-POLYMER PARTICLES

(75) Inventors: Kwok Tang, Mississauga; Guomin Bian, Toronto, both of (CA); Leena Matilainen, Kauniainen; Sinikka Ingelin, Porvoo, both of (FI)

(73) Assignee: Neste Resins Canada, Mississauga (CA)

( * ) Notice: Subject to any disclaimer, the term of this patent is extended or adjusted under 35 U.S.C. 154(b) by 0 days.

(21) Appl. No.: 09/571,845

(22) Filed: May 16, 2000

(51) Int. Cl.⁷ .............................. C08L 61/24; C08L 61/28
(52) U.S. Cl. ........................ 524/843; 524/458; 524/593; 524/801; 524/818; 524/850; 524/877; 525/330.9; 525/398; 525/400; 528/254; 528/256; 528/266; 528/492; 528/503
(58) Field of Search ..................................... 524/843, 458, 524/593, 801, 818, 850, 877; 525/380.9, 398, 400; 528/254, 256, 266, 492, 503

(56) References Cited

U.S. PATENT DOCUMENTS

| | | | |
|---|---|---|---|
| 4,059,550 | * 11/1977 | Shimp | 260/29.4 R |
| 4,098,746 | * 7/1978 | Becker et al. | 260/29.4 UA |
| 4,141,871 | * 2/1979 | Mitzel et al. | 260/29.4 R |
| 4,321,170 | * 3/1982 | Zabrocki et al. | 524/285 |
| 4,454,254 | * 6/1984 | Reichel et al. | 521/136 |
| 4,668,730 | * 5/1987 | Iovine et al. | 524/460 |
| 4,981,885 | * 1/1991 | Engel et al. | 523/409 |
| 5,246,616 | 9/1993 | Bito et al. | |
| 5,302,654 | * 4/1994 | Ishii et al. | 524/458 |
| 5,344,704 | 9/1994 | O'Dell et al. | |
| 5,389,705 | * 2/1995 | Huemke et al. | 523/417 |
| 5,411,802 | * 5/1995 | Davis et al. | 428/402 |

FOREIGN PATENT DOCUMENTS

WO9707152 A1  2/1997 (WO).

* cited by examiner

Primary Examiner—Duc Truong
(74) Attorney, Agent, or Firm—Birch, Stewart, Kolasch & Birch, LLP

(57) ABSTRACT

A one-step, in-situ, process for producing a high solids content emulsion or dispersion of partially or totally crosslinked urea formaldehyde or melamine formaldehyde resin droplets or particles, by forming a reaction mixture of (i) aqueous formaldehyde (formalin), (ii) at least one water-soluble protective colloid, (iii) water and (iv) optionally a surfactant, and mixing the reaction mixture in a reaction vessel; optionally adjusting the initial pH of the reaction mixture according to a desired value as needed; adding (a) urea, substituted urea, or a mixture thereof, or (b) melamine, substituted melamine, or a mixture thereof, to the reaction mixture; and heating the reaction mixture to a temperature at which condensation takes place between the (a) urea, substituted urea, or the mixture thereof, or (b) melamine substituted melamine, or the mixture thereof, and the formaldehyde to form a urea formaldehyde or melamine formaldehyde resin, and holding the reaction mixture at that temperature or a higher temperature, under mixing, for a period of time sufficient to achieve a desired degree of crosslinking in said urea formaldehyde or melamine formaldehyde resin; and cooling the reaction mixture. The droplet or particle size of the resulting resin dispersion can be controlled and adjusted by way of the present technique to the application requirements.

24 Claims, No Drawings

METHOD OF PREPARING CO-POLYMER PARTICLES

FIELD OF THE INVENTION

The present invention relates to a method of manufacturing aminoplast co-polymer droplets and particles, including urea formaldehyde and melamine formaldehyde resins droplets and particles, in which the mean particle size of the droplets and particles can be controlled and can be adjusted to the application requirements.

Products made by this method can be used in a range of applications, such as special adhesives, as friction and molding materials, as abrasion-resistant additives for laminates, films and compounds, as organic fillers, or anti-slip additives in laminate overlays.

BACKGROUND OF THE INVENTION

Aminoplast resins such as urea-formaldehyde resins and melamine-formaldehyde resins, also referred to as urea resins and melamine resins, are produced by reacting aqueous formaldehyde (formalin) with urea or melamine, respectively. The reaction, also known as a cook, involves methylolation and condensation, during which step methylolated molecules react with each other (crosslinking), forming larger molecules.

In resin manufacturing, condensation is normally stopped before all reactive sites have reacted and total crosslinking has taken place, and the resin is then transferred to the site of application where total irreversible crosslinking is induced in a specific application set-up by heat and optionally a catalyst.

A phenomenon that is especially known in melamine resins is that during the condensation reaction the so-called water tolerance of the resin decreases because larger melamine resin molecules exhibit a poor solubility in water. The water tolerance of a melamine resin is measured by adding water to a resin sample until the sample becomes turbid. Water tolerance is then defined as the amount of water that can be added to a unit-quantity of resin. Water tolerance is also a function of temperature. This phenomenon is used in a method known as the cloud point method to follow such reactions and make sure that the reaction is stopped before a certain critical or targeted point is reached. Continuing the reaction beyond this point will result in even larger molecules and consequently in too low a water tolerance level under given conditions and in precipitation of part of the melamine resin, an event that chemists normally want to avoid due to its negative consequences.

However, for certain applications it is requested to cross these limits because the progressing condensation and crosslinking give partially or totally crosslinked melamine resin droplets or particles with properties that are very suitable in such applications. As indicated above, crossing these limits of water tolerance will result in water-incompatible conglomerates in an aqueous phase, a situation that is very unpractical.

An elegant way to deal with this problem has been to create an emulsion where the water incompatible molecules are present in the aqueous water phase as droplets or particles, where the protective colloid is dispersing the hydrophobic phase in the aqueous phase. However, to be technically and economically attractive, such emulsions have to meet a range of criteria. Firstly, they have to be stable over a required period. Secondly, the droplet size or particle size of the partially or totally crosslinked melamine resin droplets or particles has to suit the specific application at hand. Thirdly, the economics of the total system have to be attractive, i.e. the raw material cost and the conversion cost have to be within certain competitive ranges. Finally, environmental issues must be considered.

U.S. Pat. No. 5,246,616 describes a process for producing particles of crosslinked melamine resin with a claimed uniform diameter starting from a water-soluble methyl-etherified melamine resin. Such a methyl-etherified melamine resin is condensed under stirring in the presence of a protective colloid such as a copolymer of acrylamide or methylacrylamide with acrylic acid or methylacrylic acid, a partial hydrolyzate of acrylamide and/or methyl-acrylamide, or a saponified product of acrylonitrile (typically a copolymer of methacrylic acid and acrylamide), at a pH of 5–8 (typically around 6) and at elevated temperatures (typically around 60° C.). The solids content of the suspension is above 10 wt. % but below 30 wt. %, typically 13–27 wt. %. The resulting particle size is given as 4–12 µm. The suspension is filtered and the separated filter cake dried and ground. The yield after separation and drying is quite poor, between 34–78 wt. %, depending on the particle size.

This process applies the emulsifying concept to prevent the precipitation of the melamine resin polymer, on becoming water insoluble during condensation (crosslinking). The precipitate will stick around the stirrer and on the reactor wall, thus preventing efficient stirring and presenting a process situation that is very difficult to handle on full scale.

However, a major disadvantage of this method is that it requires a partially methyl-etherified melamine resin instead of a melamine formaldehyde resin as starting material, thus adding to the product costs as well as representing a potential environmental problem due to the methanol involved. A minimum of 10% of the methylol groups must be etherified, and typically this is 35–50%, which is a considerable percentage.

Another disadvantage of this method is that the solids content of the resulting suspension is relatively low below 30% (typically 13–28%). In combination with the rather low yield after separation and filtration, this implies a high process volume to end-product volume ratio and also that a considerable amount of water be involved. As this water is likely to be contaminated with very fine emulsion particulates, this will pose a severe environmental problem as well as a cost issue.

Still another problem of this method concerns the control of the mean particle size diameter. Although the particle diameter is said to be uniform (within a given condition of reactor geometry and with a given formulation) the mechanism to adjust the desired particle size is not indicated and unclear. One way to influence the particle size seems to be the solids content in the resulting reaction liquid where a lower solids content seems to give a smaller particle size. This again adds to the low solids content problem as outlined above. Another way to influence particle size is said to be the addition of solvents like methanol and/or glycerine. Such additions are however very disadvantageous for environmental reasons and also add to the cost of the product.

In WO 97/07152 (PCT/US96/13384) a method is described for making cured (crosslinked) resin particles of melamine formaldehyde resin, by mixing an aqueous solution of the resin or its precursor with a water insoluble stabilizing agent, i.e. micro-crystalline cellulose. Sufficient water is provided to exceed the water tolerance level of the resin and an emulsion of resin droplets in the water phase. The resin molecules are then further cured (advanced) by heat resulting in partially or totally cured resin particles of uniform particle size as dispersed droplets or particles in an aqueous phase.

This method is a two- or three-step method. In step (1) a melamine formaldehyde resin is manufactured to a desired degree of partial cure (crosslinking), in step (2) a mixture of a water insoluble stabilizing agent in water is made, and then in step (3) this mixture is added to the melamine formaldehyde resin, forming an emulsion of resin droplets in an aqueous phase, after which the condensation or curing of the resin molecules in these droplets is advanced to the desired degree of cure (crosslinking). Two features of this method are said to be important: the use of a suitable stabilizing agent, preferably MCC (microcrystalline cellulose), and the time during the process at which the stabilizing agent water solution is added to the resin, or, in other words, the degree of partial cure of the melamine resin just before the stabilizing agent is added. This timing is claimed to control the size of the emulsified resin droplets or particles. The degree of curing must therefore be carefully followed by using differential scanning calorimetry (DSC), measuring the residual energy remaining in the resin, which indicates the remaining degree of cure, which is possible. The resin in step (1) is still totally water-soluble under the given conditions, but by adding water, the resin will pass the water tolerance limit and become partially water insoluble. Due to the presence of a stabilizing agent however, an emulsion is formed.

The choice of the stabilizing agent is said to be crucial as other stabilizing agents can cause foaming or wetting problems, while some also require the resin to be added to the colloid solution rather than vice versa, and result in non-uniformly sized resin particles. Microcrystalline cellulose (MCC) is the preferred agent, to be added in the range of 0.6% to 3.0% based on dry solids.

The major disadvantage of the above-described method is the fact that it is a three-step process with the need to prepare the aqueous mixture with the stabilizing agent, which has a volume equal to the resin solution, separately from this resin solution. This requires an additional mixing vessel or reactor besides the resin reactor and thus represents an extra investment cost.

Another disadvantage is the low solids content of the system, also related to the extra water volume, containing the stabilizing agent, that needs to be added to bring the melamine resin from a stage of still sufficiently water tolerant to a stage of insufficiently water tolerant, and to create an emulsion after mixing in the presence of the stabilizing agent.

All this extra water considerably reduces the solids content of the mixture, from an initial 50% to 25%. The total system thus becomes rather inefficient and uneconomical due to the large volumes of water that need to be handled, transported and processed or cleaned.

SUMMARY OF THE INVENTION

An object of the present invention is to overcome the disadvantages of the prior art as indicated above and to provide a simple, economical and efficient method to manufacture an emulsion of partially or totally crosslinked aminoplast resins, particularly urea formaldehyde or melamine formaldehyde resins, in a one-step process by which it is also possible to adjust the average droplet or particle size to a desired value.

It is another object of the present invention to provide a method to make stable emulsions of partially or totally crosslinked urea formaldehyde and melamine formaldehyde resins, which can be used in a broad range of applications.

It is yet another object of the present invention to provide a method of manufacturing emulsions of partially or totally crosslinked urea formaldehyde and melamine formaldehyde resins, in which the solids content is higher than in prior art, thus allowing for more freedom in the window of operation for water balance in the system of application.

These objects are achieved by a one-step process which consists basically of cooking an aminoplast resin, particularly a urea formaldehyde or melamine formaldehyde resin, in an aqueous medium in the presence of a water-soluble protective colloid agent, which is preferably an amine modified or a hydrophobically modified acrylic copolymer, methacrylic copolymer or urethane copolymer, or a mixture thereof, with or without a surfactant, wherein the condensation stage is continued until the desired degree of crosslinking has been reached.

The inventive process is a one-step process, which can be executed in one reactor, and the solids content of the resulting emulsion can be 25–65% by weight, and is preferably 35–55% by weight. The droplet size or particle size can be adjusted by manipulating the process and cook parameters such as the choice of protective colloid agent(s), the (individual) concentrations) thereof, and the cook recipe parameters.

DETAILED DESCRIPTION OF THE INVENTION

The present invention comprises a method of manufacturing partially or totally crosslinked aminoplast resin droplets or particles, particularly urea formaldehyde (UF) or melamine formaldehyde (MF) resin droplets or particles of a defined droplet or particle size in a single-step process and in a reproducible way, wherein the droplet or particle size can be adjusted to the requirements of the application, and wherein the solids content of the emulsion is chosen to be between 25–65% by weight, preferably between 35–55% by weight. The method consists of cooking a UF or MF resin with a formaldehyde to urea molar ratio (F/U) or formaldehyde to melamine molar ratio (F/M) as desired, in an aqueous medium in the presence of a water-soluble protective colloid or mixture of protective colloids, and optionally a surfactant. The condensation stage is continued until the desired degree of crosslinking has occurred, giving partial or total crosslinking as desired.

During the condensation, the water tolerance of the urea formaldehyde or melamine formaldehyde resin decreases, but the water insoluble resin molecules are kept "in solution" by creating an emulsion due to the presence of the right choice of protective colloids and optionally a surfactant. The invention also allows easy control of the particle size of the resulting resin droplets or particles through the choice and concentration of the colloid agent(s) or combination of colloid agent(s) and optionally surfactants in the reaction mixture. Typically, the total concentration of protective colloids in the reaction mixture is from 0.2–5.0% by weight, based on the urea formaldehyde or melamine formaldehyde solids content in the emulsion or dispersion.

The term "urea formaldehyde resin" as used herein includes UF resins resulting from the condensation of either urea, substituted urea or a mixture thereof with formaldehyde. The term "substituted urea" as used herein includes urea molecules wherein the hydrogen atom on the amino group is substituted by an alkyl, aryl, alcohol, carbonyl or any other functional group. The degree of substitution is at least one and maximum "n" (wherein n total number of amino hydrogen atoms minus one).

The term "melamine formaldehyde resin" as used herein includes MF resins, resulting from the condensation of either melamine, substituted melamine or a mixture thereof with formaldehyde. The term "substituted melamine" as used herein includes melamine molecules wherein the hydrogen atom on the amino group is substituted by an alkyl, aryl, alcohol, carbonyl or any other functional group. The degree of substitution is at least one and maximum "n" (wherein n total number of amino hydrogen atoms minus one).

As a water-soluble protective colloid, amine modified or hydrophobically modified acrylic copolymers, methacrylic copolymers or urethane copolymers, or mixtures thereof, can be used, with or without surfactant(s). Exemplary of such water-soluble protective colloids are (i) water-soluble, low molecular weight, anionic or non-ionic acrylamide or sodium acrylate copolymers, (ii) water-soluble, low molecular weight anionic polyacrylates, (iii) amine modified or hydrophobically modified acrylic copolymers in water, and (iv) mixtures thereof.

The desired particle size is obtained by adjusting the choice and concentration of the protective colloid or mixture of protective colloid(s) as well as the optional additional surfactant(s), and further by the cook recipe and procedure of the urea formaldehyde or melamine formaldehyde resin production, and can be from a sub-micron level up to 180 microns. Preferably, the formed droplets or particles have a mean particle size of 0.5–150 micron.

The resulting urea formaldehyde or melamine formaldehyde emulsions or dispersions of the invention are stable for an extended period of time.

One of the key features of the present invention is that it provides a one-step process wherein an emulsion of partially or totally cured urea formaldehyde or melamine formaldehyde droplets or particles is formed in situ. There is no need to add a large volume of water, containing a protective colloid, to the resin reaction mixture at some specific stage in the process where the resin is still completely water tolerant under the given reaction conditions, e.g., the degree of crosslinking and the temperature of the reaction mixture. In the method according to the present invention, the resin reaction mixture smoothly passes from a situation in which the resin is completely water tolerant to a situation in which the resin becomes partly, more and more water intolerant, as the growing resin molecules are gradually transferred from the aqueous medium to droplets that are stabilized by the protective colloid. Consequently, there is also no need to follow the reaction carefully with DSC methods to determine precisely the degree of crosslinking and no need to add a large volume of water (with protective colloids) in order to create an emulsion at a specific time during the process.

Another key feature of the present invention is that the solids content of the resulting emulsion can be chosen almost as high as the solids content of the resin itself because the concentration of the protective colloids solution is quite high (typically between 30–100% by weight) and the amount of protective colloids that needs to be added is very low.

Yet another key feature of the present invention is that the droplet or particle size can be adjusted to the requirements of the targeted application. This can be done by variation of the choice of protective colloid or mixture of protective colloids, by the concentration(s) thereof, and by changing the cook recipe and procedure.

According to the present invention, manufacturing of a high-solids emulsion of partially or totally crosslinked aminoplast resin, particularly melamine formaldehyde resin, droplets or particles is preferably done in the following manner.

Aqueous formaldehyde (formalin) is charged to a reactor of suitable dimensions, and equipped with a suitable mixing facility and sufficient heating capabilities. Water is then charged and mixed with the formalin to obtain the desired resin solids content. The water can also be charged before the formalin is charged, if desired. Subsequently, a sufficient amount of the protective colloids solution is added and mixed in. In the case where a mixture of protective colloids is to be added, they are added one after another. The protective colloid agent can also be added after charging the water, before the formalin. The pH is checked after the formalin charging and then can be optionally adjusted to a desired pH according to the specific recipe with a base or an acid. The initial pH of the mixture prior to adjusting is from 2–8, preferably from 3–7. Upon optionally adjusting the initial pH, the initial pH is normally from pH 5–10, preferably from 6–9.5, but is only limited by the recipe being used. Next, urea and/or substituted urea, or melamine and/or substituted melamine, is charged within 15–20 minutes into the reaction mixture.

The amount of urea and/or substituted urea, or melamine and/or substituted melamine added depends on the desired formaldehyde to urea molar ratio (F/U) or formaldehyde to melamine molar ratio (F/M). After the urea and/or substituted urea, or melamine and/or substituted melamine addition, the reactor content is heated—under continuous mixing—within 2 hours to 40–105° C., preferably 65–100° C. After 30 minutes at 40–105° C., preferably 65–100° C., all the urea, substituted urea, melamine and substituted melamine present, should be dissolved. Thereafter, the mixing is allowed to continue and the reaction mixture is held at 40–105° C., preferably 65–100° C., until the desired stage of crosslinking has been reached. A typical value is 2–12 hours, but is more typically 3–10 hours. Then, after the desired degree of crosslinking has occurred, the reaction mixture is cooled down to about room temperature (~20–25° C.).

The resulting emulsion or dispersion can be used as such or can be spray-dried, giving a powder of urea formaldehyde or melamine formaldehyde particles of the same size.

EXAMPLES

Example 1

A reactor was charged with 1408 parts of demineralized water. The agitator speed was set at 100 rpm. Then 4 parts of polymer B were added, and—after 40 minutes of mixing—16 parts of a 50% aqueous solution of polymer A were added, both as protective colloids. Additionally, 8 parts of a liquid, alkylphenol ethoxylate type surfactant were added, and mixing was continued for another 30 minutes. Subsequently, 1221 parts of formalin (52%) were charged to the reactor and the pH was checked and adjusted to pH 7 with diluted acetic acid. After pH adjustment, 1335 parts of melamine crystal were charged within 15 minutes under efficient mixing conditions, and the reactor content was linearly heated to 80° C. in 2 hours. After this heat-up the melamine is dissolved. The reaction mixture was kept at 80° C. for 3.5 hours, after which the reactor content was heated up to 98° C. in 50 minutes and held at that temperature for 1 hour. Finally, the reactor content was cooled down to 55°

C., 8 parts of a cellulose thickener were added and cooling was continued down to 20° C.

The result was a stable, 49.9% solids, melamine formaldehyde resin emulsion, containing droplets with a mean particle size of 9.0 micron.

Example 2

A resin emulsion similar to example 1 was produced. In the formulated protective colloids mixture, polymer B was exchanged with polymer C. The result was a 49.9% solids, melamine formaldehyde resin emulsion, containing droplets with a mean particle size of 48.7 micron.

Example 3

A reactor was charged with 1032 parts of demineralized water and then 68.9 parts of an aqueous protective colloid polymer D were added under mixing (100 rpm). Then 1417.3 parts of aqueous (48%) formaldehyde were added, and the pH was checked and adjusted to 9 with aqueous (25%) caustic solution. Subsequently, 1401.7 parts of melamine crystal were added within 10 minutes.

The reaction mixture was then heated to 95–100° C. in one hour. After reaching a temperature of 100° C. and when the melamine had been dissolved completely, the agitator rotation speed was increased to 300 rpm. The reaction mixture was held at 95–100° C. for 6 hours, and then cooled down to room temperature.

The result was a stable, 55% solids emulsion with a mean particle size of 27.9 micron and 90% of the particle's diameter being within a 11–49 micron range. The concentration of the protective colloid (based on active ingredient per melamine resin solids) was 1.0%.

Example 4

A resin emulsion similar to example 3 was produced. The concentration of the protective colloid was changed to 1.3%. The result was a stable, 55% solids melamine formaldehyde resin emulsion, containing particles with a mean particle size of 47.8 micron and 90% of the particle's diameter being within 13 and 86 micron.

Example 5

A reactor was charged with 1839 parts of demineralized water. The agitator speed was set at 120 rpm. Then 3 parts of protective colloid polymer B were added, and after 30 minutes of mixing, 12 parts of a 50% aqueous solution of protective colloid polymer A were added, both as protective colloids. Additionally, 6 parts of a liquid, alkylphenol ethoxylate type surfactant were added, and mixing was continued for another 30 minutes. Subsequently, 924 parts of formalin (52%) were charged to the reactor and the pH was checked and adjusted to pH 6.7 with diluted acetic acid. After pH adjustment, 1010 parts of melamine crystal were charged within 25 minutes under efficient mixing conditions, and the reactor content was heated to 80° C. in 1.5 hours. The reaction mixture was kept at 80° C. for 4 hours, after which the reactor content was heated up to 98° C. in 30 minutes and held at that temperature for 1 hour. Finally, the reactor content was cooled down to 55° C., 8 parts of a cellulose thickener were added and mixed in during 30 minutes, after which cooling was continued down to 20° C.

The result was a 39.8% solids melamine formaldehyde resin emulsion, containing droplets with a particle size between 0.2 and 10 micron.

What is claimed is:

1. A one-step, in-situ, process for producing a high solids content emulsion or dispersion of partially or totally crosslinked aminoplast resin droplets or particles, comprising:
    forming a reaction mixture containing (i) aqueous formaldehyde(formalin), (ii) at least one water-soluble protective colloid, (iii) water and (iv) optionally a surfactant, and mixing the reaction mixture in a reaction vessel;
    optionally adjusting the initial pH of the reaction mixture to a desired value;
    adding (a) urea, substituted urea or a mixture thereof, or (b) melamine, substituted melamine or a mixture thereof, to the reaction mixture; and
    heating the reaction mixture to a temperature at which condensation takes place between (a) the urea, substituted urea or mixture thereof, or (b) the melamine, substituted melamine or mixture thereof, and the formaldehyde, to form a urea formaldehyde or melamine formaldehyde resin, and then holding the reaction mixture at said temperature or a higher temperature, under mixing, for a period of time sufficient to achieve a desired degree of crosslinking in said urea formaldehyde or melamine formaldehyde resin; and
    cooling the reaction mixture.

2. A method according to claim 1, wherein a mean particle size of the resulting droplets or particles is between 0.5 and 150 micron.

3. A method according to claim 1, wherein the at least one water-soluble protective colloid is an amine modified or hydrophobically modified acrylic copolymer, methacrylic copolymer, urethane copolymer, or a mixture thereof.

4. A method according to claim 1, wherein the at least one water-soluble protective colloid is:
    (i) a water-soluble, low molecular weight, anionic or non-ionic acrylamide or sodium acrylate copolymer, (ii) a water-soluble, low molecular weight anionic polyacrylate, (iii) an amine modified or hydrophobically modified acrylic copolymer in water, or (iv) a mixture thereof.

5. A method according to claim 1, wherein the high solids content of the emulsion or dispersion is 25–65% by weight.

6. A method according to claim 1, wherein the high solids content of the emulsion or dispersion is 35–55% by weight.

7. A method according to claim 1, wherein the initial pH of said reaction mixture is from 5–10.

8. A method according to claim 1, wherein the initial pH of the said reaction mixture is from 6–9.5.

9. A method according to claim 1, wherein the reaction temperature is from 40–105° C.

10. A method according to claim 1, wherein the reaction temperature is from 65–100° C.

11. A method according to claim 1, wherein the reaction time is from 2–12 hours.

12. A method according to claim 1, wherein the reaction time is from 3–10 hours.

13. A method according to claim 11 wherein the total concentration of protective colloids in the reaction mixture is from 0.2–5.0% by weight, based on the urea formaldehyde, substituted urea formaldehyde, melamine formaldehyde or substituted melamine formaldehyde solids content in said emulsion or dispersion.

14. A method according to claim 1, wherein urea, substituted urea, or a mixture thereof, is reacted with the formaldehyde.

15. A method according to claim 1, wherein melamine, substituted melamine, or a mixture thereof, is reacted with the formaldehyde.

16. A method for producing a spray-dried powder of partially or totally crosslinked aminoplast resin droplets or particles, said method comprising:

forming a reaction mixture containing (i) aqueous formaldehyde (formalin), (ii) at least one water-soluble protective colloid, (iii) water and (iv) optionally a surfactant, and mixing the reaction mixture in a reaction vessel;

optionally adjusting the initial pH of the reaction mixture to a desired value;

adding (a) urea, substituted urea or a mixture thereof, or (b) melamine, substituted melamine or a mixture thereof to the reaction mixture; and heating the reaction mixture to a temperature at which condensation takes place between (a) the urea, substituted urea or mixture thereof, or (b) the melamine, substituted melamine or mixture thereof, and the formaldehyde to form a urea formaldehyde or a melamine formaldehyde resin, and holding the reaction mixture at that temperature or a higher temperature, under mixing, for a period of time sufficient to achieve a desired degree of crosslinking in said urea formaldehyde or melamine formaldehyde resin;

cooling the reaction mixture; and spray-drying the reaction mixture to give a spray-dried powder of said partially or totally crosslinked urea formaldehyde or melamine formaldehyde resin droplets or particles.

17. A method according to claim 16, wherein a mean particle size of the resulting spray dried powder is between 0.5 and 150 micron.

18. A method according to claim 16, wherein the at least one water-soluble protective colloid is an amine modified or hydrophobically modified acrylic copolymer, methacrylic copolymer, urethane copolymer, or a mixture thereof.

19. A method according to claim 16, wherein the at least one water-soluble protective colloid is:

(i) a water-soluble, low molecular weight, anionic or non-ionic acrylamide or sodium acrylate copolymer, (ii) a water-soluble, low molecular weight anionic polyacrylate, (iii) an amine modified or hydrophobically modified acrylic copolymer in water, or (iv) a mixture thereof.

20. A method according to claim 16, wherein the high solids content of the emulsion or dispersion is 25–65% by weight.

21. A method according to claim 16, wherein the initial pH of said reaction mixture is from 5–10.

22. A method according to claim 16, wherein the reaction temperature is from 40–105° C.

23. A method according to claim 16, wherein the reaction time is from 2–12 hours.

24. A method according to claim 16, wherein the total concentration of protective colloids in the reaction mixture is from 0.2–5.0% by weight, based on the urea formaldehyde, substituted urea formaldehyde, melamine formaldehyde or substituted melamine formaldehyde solids content in said emulsion or dispersion.

* * * * *